A. J. DILLEY.
GREASE CUP.
APPLICATION FILED APR. 9, 1917.
1,255,113.
Patented Jan. 29, 1918.
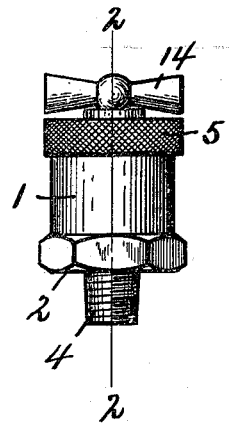
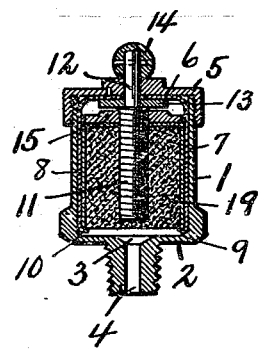
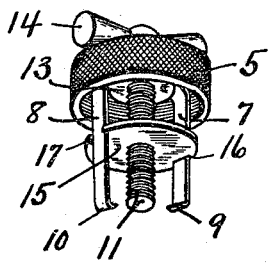
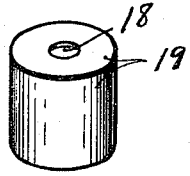
INVENTOR
Argus J. Dilley
BY
Howard P. Denison
ATTORNEY

UNITED STATES PATENT OFFICE.

ARZENO J. DILLEY, OF MUIR, MICHIGAN, ASSIGNOR OF ONE-HALF TO FRED W. GREEN, OF IONIA, MICHIGAN.

GREASE-CUP.

1,255,113. Specification of Letters Patent. Patented Jan. 29, 1918.

Application filed April 9, 1917. Serial No. 160,688.

*To all whom it may concern:*

Be it known that I, ARZENO J. DILLEY, a citizen of the United States, and resident of Muir, in the county of Ionia, in the State of Michigan, have invented new and useful Improvements in Grease-Cups, of which the following, taken in connection with the accompanying drawings, is a full, clear, and exact description.

This invention relates to certain improvements in grease cups.

The primary object of the invention is to produce a grease cup adapted to be loaded with a collapsible grease containing capsule, and one that is practicable and efficient for commercial use and requires but a minimum amount of space when assembled for use.

Another object relates to the capsule holder and puller for initially holding the capsule in desired position and for removing it from the bottom of the grease cup when the grease is all discharged from the capsule.

Another object relates to the specific form and construction of the collapsible capsule, in combination with specific co-acting portions of the structure of the grease cup.

Other objects and advantages will appear from the following description, taken in connection with the accompanying drawings, in which—

Figure 1 is an elevation of the grease cup.

Fig. 2 is a cross section on line 2—2, Fig. 1.

Fig. 3 shows the cap and elements carried thereby, separate from the body of the grease cup.

Fig. 4 is a perspective view of the capsule.

The invention as shown comprises a hollow body portion —1— of cylindrical form having a transverse bottom wall —2— formed with a discharge opening —3— and a threaded nozzle —4— leading therefrom.

A flanged cap —5— is provided for co-acting engagement with the body —1— and adapted to close the same, and preferably the external portion of the body is threaded and the internal portion of the flange upon the cap is likewise threaded for coöperative engagement with each other. Within the cap —5— is arranged and secured a circular disk —6—, preferably formed of thin flexible sheet metal and having integral fingers —7— and —8— preferably diametrically disposed and extending parallel with the axis of the cap —5— and having their ends inturned and formed with hook portions —9— and —10—, respectively, for a purpose hereinafter described.

A screw or threaded rod —11— is provided having a reduced shank —12— upon which is mounted a washer —13— rigidly secured to the rod and in assembled condition lying in contact with the disk —6— within the cap —5—, the shank —12— extending through the disk and through the cap and having a handle —14— mounted thereon externally of the cap, the handle —14— and washer —13— constituting stops positioned upon opposite sides of the cap for preventing longitudinal movement of the screw —11—.

Upon the screw —11—, a suitable plunger —15— is mounted, preferably of a diameter substantially equal to the interior diameter of the body —1— and provided with opposite slots —16— and —17— in which the fingers —7— and —8— are positioned to prevent rotation of the plunger.

The grease capsule —19— is, as shown, of cylindrical form and of slightly less diameter than the interior diameter of body —1— and entirely open at one end, its opposite end being closed except for a central perforation —18— of a size adapted to receive the screw —11—. The capsule is mounted on the cap —5— by inserting the screw —11— in perforation —18— and forcing the capsule down toward the plunger —15— until the hooks —9— and —10— engage over the open end of the capsule, it being understood that the plunger —15— is retracted into substantial contact with washer —13— by turning handle —14— before the capsule is mounted within the cap. This assembled condition is best shown in Fig. 2.

The grease may be forced from the cup and the capsule collapsed by turning handle —14—, whereby the plunger —13— is moved toward the transverse wall —2— forcing the grease through the discharge opening —3— and collapsing the capsule as it moves. When the grease is all discharged from the capsule, the handle —14— may be turned in the reverse direction to retract the plunger, the cap may be unscrewed from the body portion, and the structure shown in Fig. 3 removed from the body portion carrying along with it the collapsed capsule.

Although I have shown and described one specific construction, form and arrangement of the parts, I do not desire to limit myself to the same, as many changes may be made in the details of each without departing from the spirit of this invention as set forth in the appended claims.

What I claim is:—

1. A grease cup comprising a body portion having a discharge orifice and adapted to contain a grease capsule, a cap removably secured to the body portion, a plunger, a screw for actuating the plunger to collapse a capsule, and a finger carried by the cap for picking up a collapsed capsule.

2. A grease cup comprising a body portion having a discharge orifice and adapted to contain a grease capsule, a cap removably secured to the body portion, a longitudinally stationary screw rotatably carried by the cap, a plunger having a threaded engagement with said screw, a finger carried by the cap and engaged with the plunger and adapted to pick up a collapsed grease capsule.

3. A grease cup comprising a body portion having a discharge orifice and adapted to contain a capsule, a cap secured to the body portion, a longitudinally stationary screw rotatably carried by the cap, a plunger having a threaded engagement with said screw, a slot in said plunger, a finger carried by the cap and positioned in said slot to prevent rotation of the plunger, and a flange on the finger for engaging a capsule.

4. A grease cup comprising a body portion having a discharge orifice and adapted to contain a capsule, a cap removably secured to the body portion, a screw positioned within the cap and having a shank extending through the cap, a handle mounted on the shank outside the cap, a plunger having a threaded engagement with the screw, said plunger having a plurality of recesses formed in the periphery thereof, fingers mounted on the cap and positioned in said recesses respectively, and hooks on the fingers adapted to engage a capsule.

5. A grease cup comprising a body portion having a discharge orifice, a cap removably secured to the body portion, a disk within the cap and having fingers extending substantially parallel with the axis of the cap, a screw within the cap and having a shank extending through said disk and cap, a handle mounted on the shank outside the cap, a washer mounted on the shank within the cap and lying in substantial contact with said disk, a plunger having a threaded engagement with said screw, said plunger provided with recesses in its periphery for the reception of said fingers, and hooks on the fingers adapted to engage a capsule.

6. The combination with a capsule having one end open and its opposite end closed except for a central perforation, of a grease cup comprising a body portion having a small discharge opening and a transverse wall about the opening arranged to furnish a perpendicular abutment for the full open end of the capsule, a cap removably secured to the body portion, a longitudinally stationary screw rotatably mounted on the cap and adapted to extend through the central perforation in the closed end of said capsule, a plunger having a threaded engagement with said screw for collapsing the capsule, and fingers mounted on the cap and provided with hooks adapted to engage the open end of the capsule to hold the capsule relatively to the plunger and withdraw it from the body portion.

7. The combination with a capsule having one end open and its opposite end closed except for a central perforation, of a grease cup comprising a body portion having a small discharge opening and a transverse wall about the opening arranged to furnish a perpendicular abutment for the full open end of the capsule, a cap removably secured to the body portion, a longitudinally stationary screw rotatably mounted on the cap and adapted to extend through the central perforation in the closed end of said capsule, a plunger having a threaded engagement with said screw for collapsing the capsule, said plunger provided with peripheral recesses, fingers mounted on the cap and positioned in said recesses and provided with hooks adapted to engage the open end of the capsule to hold the capsule relatively to the plunger and withdraw it from the body portion.

In witness whereof I have hereunto set my hand this 2nd day of April, 1917.

ARZENO J. DILLEY.

Witnesses:
A. L. HARRIS,
P. L. BEARON.